H. HUEBER.
FUEL GAGE.
APPLICATION FILED DEC. 28, 1916.

1,270,735.

Patented June 25, 1918.

WITNESSES:
F. C. Matheny
B. A. Talmadge

INVENTOR
HENRY HUEBER
BY
Cook + Matheny
ATTORNEY

UNITED STATES PATENT OFFICE.

HENRY HUEBER, OF SEATTLE, WASHINGTON, ASSIGNOR TO ARNOLD A. BARKEY, OF SEATTLE, WASHINGTON.

FUEL-GAGE.

1,270,735.  Specification of Letters Patent.  Patented June 25, 1918.

Application filed December 28, 1916. Serial No. 140,461.

*To all whom it may concern:*

Be it known that I, HENRY HUEBER, a citizen of the United States, and a resident of Seattle, in the county of King and State of Washington, have invented a new and useful Improvement in Fuel-Gages, of which the following is a specification.

This invention relates to improvements in gages for indicating the amount of fuel in the fuel tank of a motor vehicle, and the object of this improvement is to provide a gage of this class that is cheap and simple in construction and easy to install on the fuel tanks of motor cars now in common use.

The invention consists in the novel construction, adaptation, and combination of parts, as will be more clearly hereinafter described and claimed.

Figure 1:
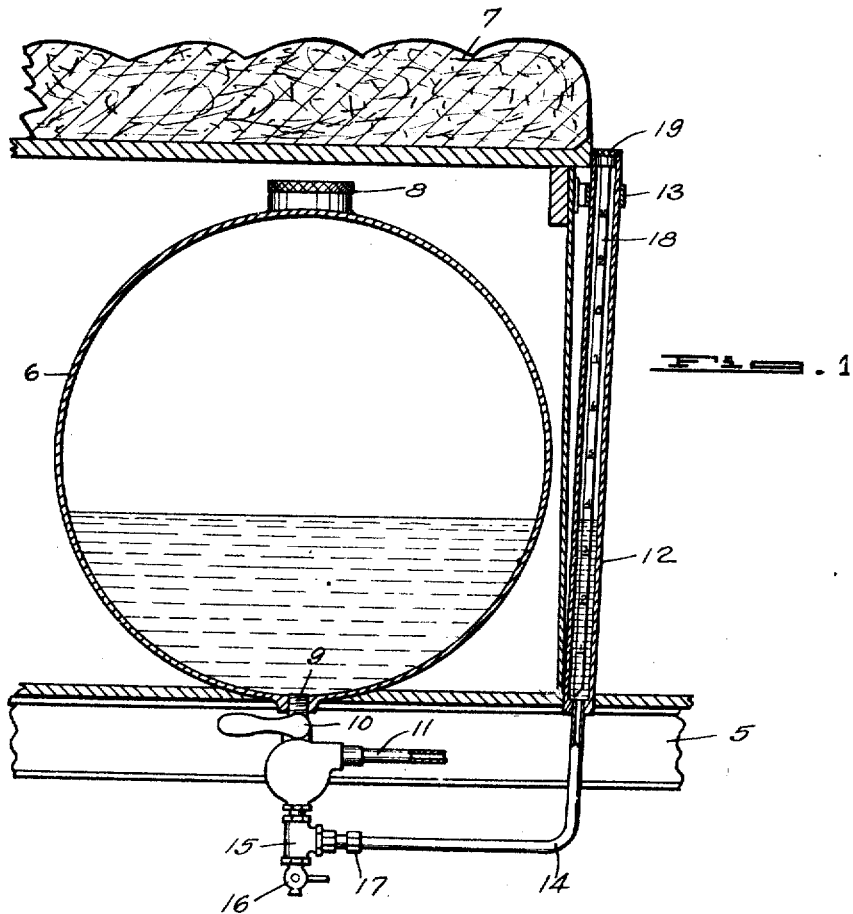
Figure 2:
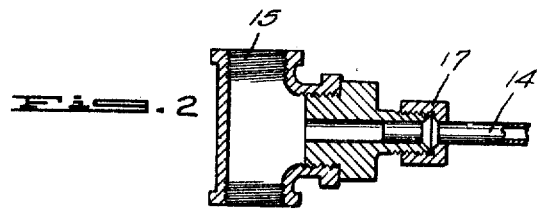

In the accompanying drawings, Figure 1 is a somewhat diagrammatic view, partly in section and partly in elevation, of my device as it may appear when it is installed on the fuel tank of an automobile; and Fig. 2 is an enlarged detached sectional view illustrating details of the invention.

Referring to the drawings, throughout which like reference numerals indicate like parts, the numeral 5 indicates the frame of a motor car which is provided with a fuel tank 6 usually located underneath the front seat 7 of the car.

The fuel tank 6 is provided with a suitable inlet 8 through which fuel may be introduced, and with an outlet 9 having a shut-off valve 10 and connected with a fuel conduit pipe 11 that may lead to the engine of the car.

My fuel gage consists in a tube 12 adapted to be secured to the outside of the car frame 5 by a bracket 13 and connected at its lower end with a pipe 14 of smaller diameter that terminates in a T fitting 15, one end of which is connected with the fuel outlet 9 and the other end of which is provided with a valve 16 that may be opened to permit the tank 6 or the tube 12 to be drained.

The pipe 14 is preferably provided near the T fitting 15 with a union 17 of a form more clearly shown in Fig. 2.

The tube 12 is preferably about three-quarters of an inch in diameter and is adapted for the reception of a measuring pin 18 graduated from the lower to upper end thereof as shown in Fig. 1 and secured at its top end to a cap member 19 that fits snugly within the top end of the tube 12.

The tube 12 is so adjusted to the frame 5 that its bottom end is on a level with the bottom of the tank 6, and the measuring pin 18 is just long enough to reach to the bottom of the tube 12 when the cap is inserted within the top of the tube.

When the apparatus is installed as shown in Fig. 1, and the shut-off valve 10 is open, the fuel in the tube 12 and fuel tank 6 will always stand at substantially the same level; thus the depth of fuel in the fuel tank may be read directly, by removing the measuring pin 18 from the tube 12 and noting the depth to which the lower end of such pin has been immersed in the fuel.

The tube 12 is of relatively small diameter so that the fuel therein will not be agitated and caused to dampen the stick 18 above the absolute level of the fuel to any extent.

The cap member 19 is made to fit tightly within the top of the tube 12 so that the fuel within such tube will not have a chance to slop out or evaporate.

What I claim and desire to protect by Letters Patent is:

In combination with a fuel supply tank supported on the floor of a vehicle and beneath the vehicle seat, an outlet pipe section tapped into the bottom of said tank and extending below the vehicle floor, a T-fitting having one end thereof connected with the lower end of said outlet pipe section, a drain valve connected to the other end of said T-fitting, an engine fuel feed pipe connected to said outlet pipe section between the said tank and said T-fitting, a shut-off valve in said outlet pipe section between the said tank and said engine fuel feed pipe, a substantially vertical tube secured to and in front of said seat with the upper end thereof lying against the front edge of the seat bottom, the bottom of said tube being at the same level as the bottom of said fuel tank, a removably graduated measuring pin of substantially the same length as that of said tube normally disposed within the latter, said measuring pin having a cap secured to the top end thereof and fitting snugly within the top of said tube, and an elbow-shaped pipe section connecting the lateral branch of said T-fitting with the bottom of said tube whereby the depth of fuel within said tank and said tube will be substantially equal.

Signed by me at Seattle, Washington, this 10th day of November, 1916.

HENRY HUEBER.

Witnesses:
L. B. HERALD,
R. J. COOK.